Figure 1:
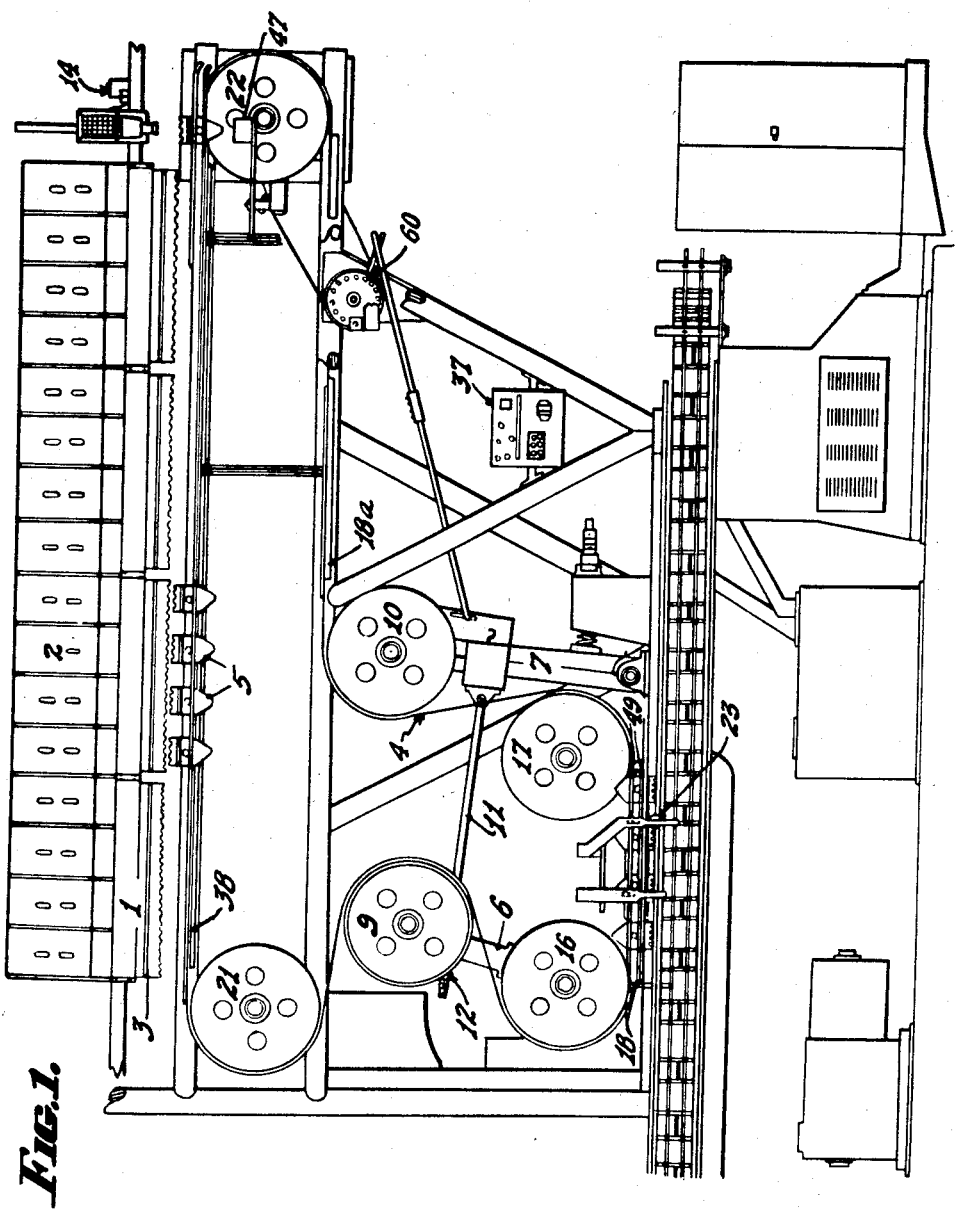

March 29, 1960  M. G. MORENO  2,930,174
MACHINE TO DEPOSIT OR FEED PREMIUMS INTO CONTAINERS
Filed Dec. 18, 1958  3 Sheets-Sheet 2

INVENTOR.
MIGUEL GARCIA MORENO,
BY Allen + Allen
ATTORNEYS.

March 29, 1960  M. G. MORENO  2,930,174
MACHINE TO DEPOSIT OR FEED PREMIUMS INTO CONTAINERS
Filed Dec. 18, 1958  3 Sheets-Sheet 3
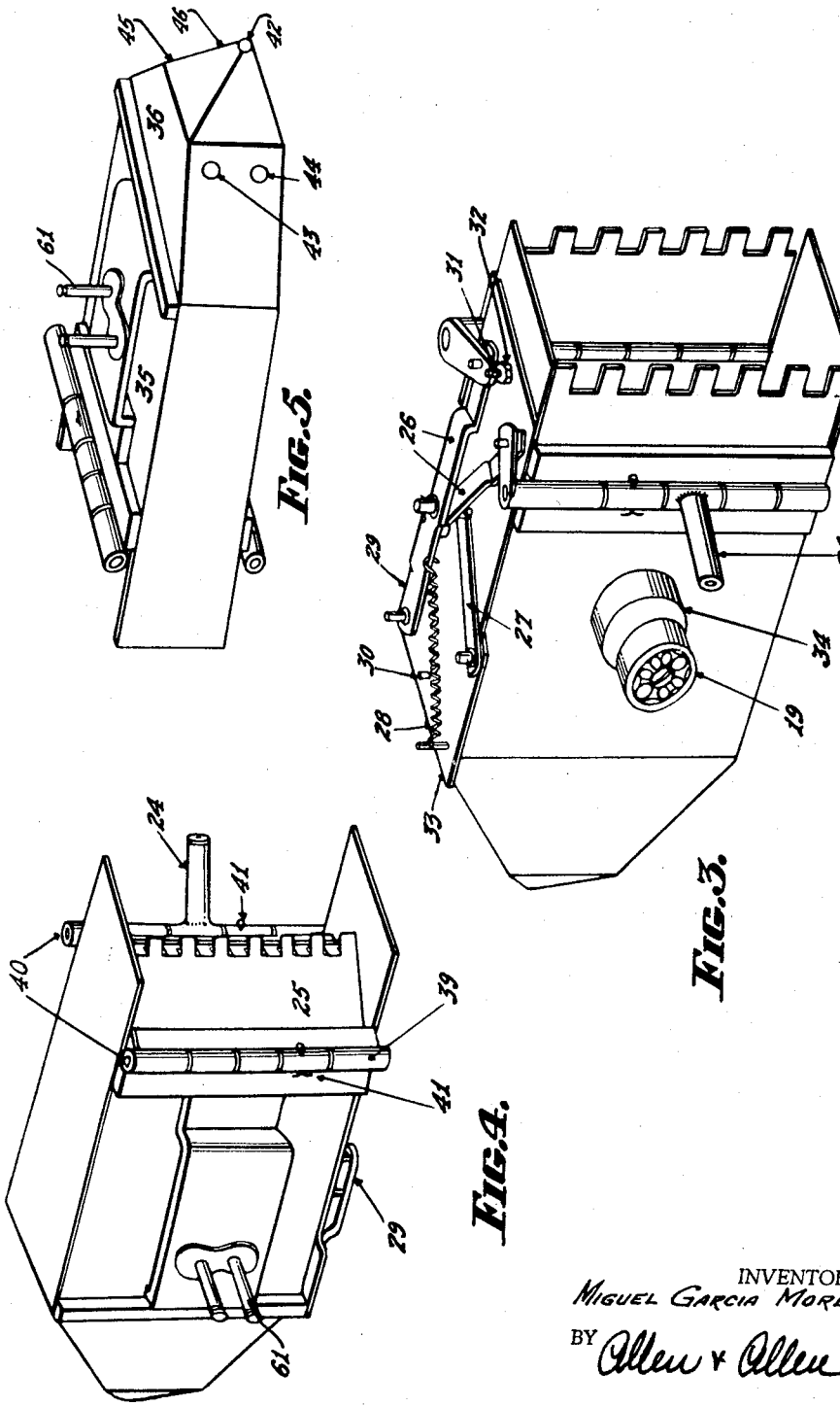
INVENTOR.
MIGUEL GARCIA MORENO,
BY Allen & Allen
ATTORNEYS.

United States Patent Office 2,930,174
Patented Mar. 29, 1960

2,930,174
MACHINE TO DEPOSIT OR FEED PREMIUMS INTO CONTAINERS

Miguel Garcia Moreno, Mexico City, Mexico, assignor to The Procter & Gamble Company, Cincinnati, Ohio, a corporation of Ohio Application December 18, 1958, Serial No. 781,231

Claims priority, application Mexico February 14, 1958

4 Claims. (Cl. 53—235)

The present invention relates to a machine to deposit and feed articles into containers.

Manufacturers of certain products such as detergents, breakfast cereals, etc., have for many years included small articles commonly called premiums in their product containers for the purpose of stimulating sales. Heretofore, the placing of the premiums into the containers has been performed manually. That is, the premiums are placed into the empty packages moving along a conveyor or by workers stationed alongside the conveyor just before the empty containers are filled with product in the packaging machine. This job is laborious and slow. The machine of the present invention eliminates to a great extent the personnel required for placing premiums into containers and it also speeds up the premium feeding operation as the machine is capable of feeding premiums into containers moving on a conveyor at the rate of 300 per minute.

The machine is equipped with an endless chain which has a plurality of premium holding buckets affixed thereto which deliver the premiums to the point where they are introduced into the containers. The chain performs various operations in the course of its travel by the use of different devices especially designed for the purpose.

The premium feeding machine of this invention is designed to operate in synchronism with the packaging machine to which it is attached insofar as speed, operation cycles, time, position, and run are concerned.

The endless chain used for conveying premiums from the upper to the lower part of the machine where the premiums are deposited into the containers is a standard ASA roller chain. There are a plurality of stainless steel buckets attached to the chain in such a way as to prevent the premiums or other objects from adhering to its walls and to permit feeding and unloading with great ease.

The chain, which moves constantly in its lower part where it is directly controlled by the packaging machine, is responsible for movement of the entire premium feeding machine. During its run the chain moves the mechanism of the machine thus producing certain conditions, one of these is that the upper part of the chain moves intermittently equal to 16 cycles of the packaging machine.

If described from the upper to the lower part, the machine may be considered as divided into three important sections: the first, called the hopper feeding section wherein the bucket-carrying chain, on passing below same, stops and starts in accordance with a well defined cycle. In this part of the machine the chain movement is intermittent.

The second section could be considered the swing arms section. This section is responsible for the alternate movement of the upper part of the chain.

The third section or motive part of the feeding machine consists of the device used to empty the buckets and the necessary guides and rails required to achieve this purpose. In this part, the chain travels constantly and is the only part of the premium feeding machine synchronized to the packaging machine.

Figure 2:
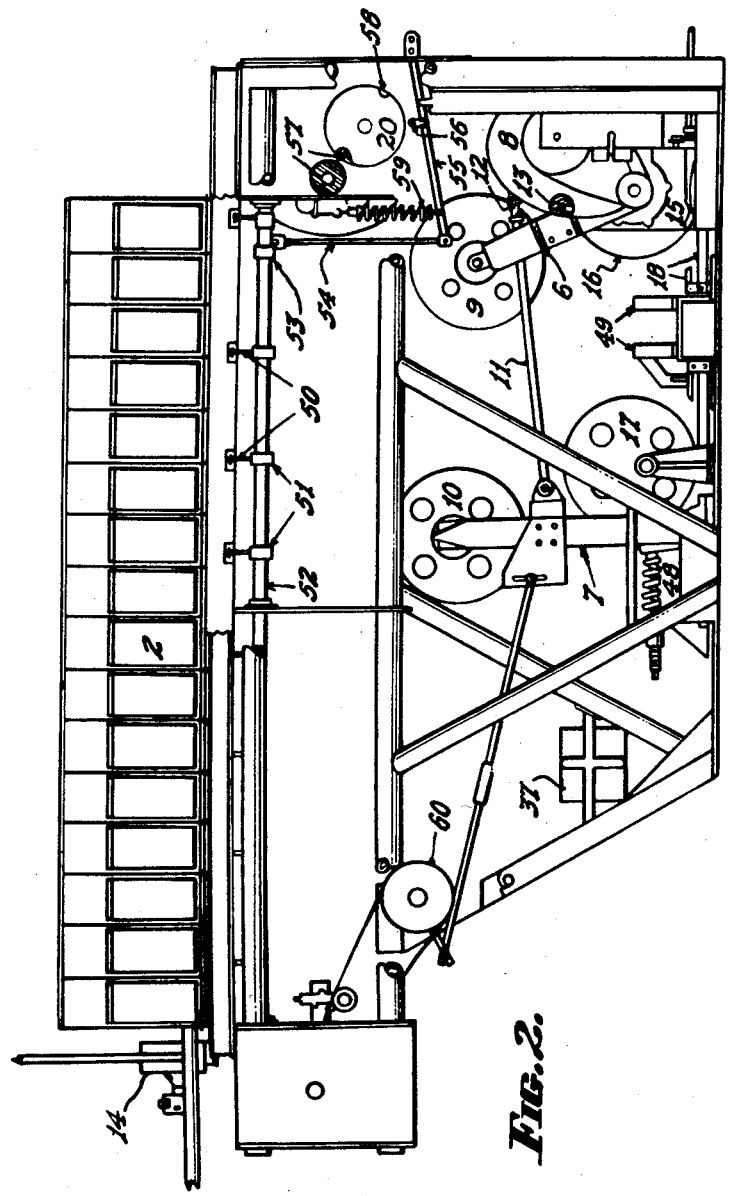

In the accompanying drawings:

Figure 1 is a side elevation taken from the front of the premium feeding machine installed over the conveyor of a conventional packaging machine; and Figure 2 is a side elevation taken from the back of the premium feeding machine of Figure 1; and Figure 3 is a perspective view of a premium carrying bucket with the cover doors open; and Figure 4 is a perspective of the bucket of Figure 3 taken from the opposite side but with the cover doors closed; and Figure 5 is a perspective of the bucket of Figure 3 taken from the opposite end and with the bucket lying on one side.

In the first section or upper part there exists a system of hoppers 1 and chutes 2, which hold and store 16 premiums at one time. Four workers on a special platform feed premiums into the chutes 2 where they fall into the hoppers 1 for discharge. The discharge hoppers 1 function automatically and only open their lower hatches 3 when the chain 4 carrying buckets 5 comes to a stop with the buckets 5 exactly beneath the hoppers 1. Thus, the operators have a period of time equal to 16 cycles of the packaging machine to load the hoppers 1 which ultimately discharge into buckets 5 attached to chain 4 before the chain resumes its travel.

Two sprockets 21 and 22 and a set of horizontal guides 38 support and align the chain 4.

The second or central section consists of two swing arms 6 and 7 driven by a cam 8 of special profile which has been designed to impart to the swing arms 6 and 7 a movement such that through their speed ratio, arms 6 and 7 are capable of stopping the upper part of chain 4 without preventing the lower part of same from moving at a constant speed. This group of arms 6 and 7 and cam 8 causes the intermittent movement of the upper part of chain 4 and permits the operators to have sufficient time to load each of the four hoppers 1 for discharge. This is the fundamental mechanism of the machine and the basic operational principle used in same. The swing arms 6 and 7 are provided at their ends with two sprockets 9 and 10 which guide chain 4 and receive at the same time or give, as the case may be, excess or shortage thereof to produce the intermittent chain movement in the upper part of the machine.

The two arms 6 and 7 are of different lengths and are connected to each other by a steel bar 11 which by a flexible connection 12 transmits the movement of the principal arm 6 to the secondary arm 7. The principal arm 6 is of lesser length and is directly coupled, by a follower roller 13 to a cam 8 of positive displacement, which during normal operation of the machine keeps turning in synchronization with the packaging machine. Secondary arm 7 being of greater length travels at an angle of less than 34° which is the maximum movement of principal arm 6. During its movement principal arm 6 takes from or gives chain 4 to the rest of the system while the auxiliary arm 7 supplements this operation, thus maintaining the constant speed in the lower part of the machine.

The third section or lower part is the one performing transfer of articles already inside buckets 5 to containers as they pass on the packaging machine. At the same time, it is responsible for the constant movement and in general for the total movement of the machine, as one of its parts is coupled to a speed reducer 15, which in turn is connected and synchronized to the packaging machine.

The lower part of the machine consists of two important parts which are actually two sprockets 16 and 17 of large diameter, which force chain 4 to pass through guides 18 especially designed to open bucket 5 which was previously closed, to vibrate same, and to convey it over the corresponding container and thus permit the premium to be transferred from bucket 5 to container.

*Operation*

In one embodiment of the machine, the chain 4 carrying buckets 5 may consist of a standard roller chain with a pitch of 25.4 mm. to which are adapted 64 buckets 5 of special design. The ends of the chain are joined to each other thus forming a continuous chain 4. During its run chain 4 passes over the six sprockets each having a 53 mm. diameter and 64 teeth each of a pitch equal to 25.4 mm., two sprockets 9 and 10 are set on swing arms 6 and 7, two sprockets 21 and 22 on the upper part, and two sprockets 16 and 17 on the lower part. These sprockets cause the changes in speed of the chain 4 in the upper part, in addition to the special movements and operations already mentioned. In the upper part of the machine, chain 4 and its buckets 5 pass by with buckets in normal position, that is to say, with the cover of bucket 5 upward, in such manner that when hoppers 1 open up the articles fall freely into buckets 5 previously opened on another part of the machine. In the lower part buckets 5 pass inverted, that is to say, with cover facing containers being conveyed to the packaging machine. In this part there is a releasing wheel 23 which opens the covers upon actuating the cover trip member 24 thus permitting discharge of the contents of the bucket 5.

Buckets 5 mentioned in the preceding paragraph are enclosures built of stainless steel sheeting or any other adequate material with pieces of the same material in the back part designed and constructed to receive terminals of roller chain 4 with a system of covers 25 which prevent articles from spilling out, no matter how small. Covers 25 effect closure by the engagement of the teeth in one cover into the notches of the opposite cover. Buckets 5 are also equipped with a cam mechanism 26 and cam 27 which are used to maintain the covers 25 of bucket 5 safely open or closed. This is achieved by means of a spring 28 and pivoted member 29. Said mechanism is interchangeable and is affixed to bucket 5 by two screws 30 and 31 with lock nut 32. The whole mechanism is on a stainless steel plate 33 in such manner as to facilitate its change by unit.

The upper part of bucket 5 is supported on one side by the terminals 61 of roller chain 4 (Figures 4 and 5) and on its other side by fixed ball bearing 19 attached to an adequate support 34 welded to bucket 5.

Buckets 5 are in the form of two geometric solids in juxtaposition, a parallelepiped 35 and a pyramid 36 with a rectangular base. The imaginary juxtaposition is effected between the base of pyramid 36 and one of the lesser faces of parallelepiped 35.

At the base of parallelepiped 35 opposite pyramid 36 are the covers 25 which are hinged at 39 to bucket 5. One half of hinge 39 is welded to cover 25 and the other to bucket 5. The joint of hinge 39 is effected by a pin 40 which is secured in its socket by cotter pin 41.

A steel cover trip member 24 welded onto hinge 39 on cover 25 of the front side is responsible for the opening and closing of covers 25.

At the vertex of pyramid 36 of each bucket 5, there has been bored an orifice 42 having a small diameter (5 mm.) which together with four other orifices, 43, 44, 45 and 46 which set at points equidistant from 42, permit the passage of light toward photocells 47 during the inspection period.

When any of said orifices 42 to 46 is covered by an article, electronic rig 37 shall find an item within bucket 5 and act accordingly, permitting machine to feed container from bucket 5 in particular.

Chain 4 with buckets 5 is moved by a sprocket 16 having 64 teeth, affixed to a gear reducer 15 directly connected to the packaging machine. Said sprocket 16 propels the entire chain 4 in its run. It moves clockwise as viewed in Figure 1.

From the control sprocket the chain 4 follows its run toward another sprocket 9, having the same number of teeth as sprocket 16. Sprocket 9 is attached to but free to rotate on main swing arm 6. Swing arm 6 is actuated by cam 8 of positive action by means of a roller follower 13 affixed to arm 6.

During its work cycle the arm 6 describes an angular movement of a variable speed equal to 34 degrees. This movement is calculated so that at certain times it will absorb the entire movement of chain 4 driven by the main sprocket 16. When this condition is satisfied, the section of chain 4 beyond the sprocket 9 on swing arm 6 remains stationary.

During the periods of movement, chain 4 passes over another similar sprocket 21 where it is aligned for entry into the horizontal guides 38. Guides 38 conduct buckets 5 beneath hoppers 1 for discharge. During the time chain 4 remains stationary, buckets 5 coincide exactly with 16 discharge hoppers 1 set above same. At this movement the covers of the discharge hoppers 1 open and the premiums previously introduced into same drop into buckets 5 which are open in the above described conditions.

When articles are inside buckets 5, the covers of hoppers 1 close and chain 4 starts traveling again until it reaches a position beyond the hoppers 1, where each bucket 5 is inspected as it passes by a photocell 47 which discovers whether the bucket is carrying a premium.

The bucket 5 is closed immediately after being inspected and turns on another sprocket 22 where it changes direction 180 degrees and continues its run on some steel guides 18a which support chain 4 and buckets 5 in inverted position and directs same to another sprocket 10 of the same type heretofore described and mounted so as to rotate on another swing arm 7 called the "secondary swing arm."

When main swing arm 6 absorbs the chain 4 issuing from the controlling sprocket 16, the auxiliary arm 7, being stopped by springs 48, provides the necessary chain 4 required by the controlling sprocket 16. Thus the constant speed of the lower section of chain 4 can be maintained while the upper section is stationary.

Chain 4 continues its run until it reaches another sprocket 17 which again changes its direction inverting by 180 degrees the position of the bucket with respect to the filling position. From here chain 4 passes to a further sprocket 16 the same as the others and it is the principal sprocket 16 as it is directly coupled to the packaging machine through speed reducer 15. Between said two sprockets 16 and 17 bucket 5 is opened and vibrated so that article may be transferred to the container. This is achieved by a releasing wheel 23 which exerts pressure on cover trip member 24 of buckets 5 to open covers 25. Thereupon some guides 49 with serrations produce the vibrations of bucket 5.

The discharge hoppers 1 are 16 in number and are set on the upper part of the machine. They consist of 16 stainless steel boxes open on top and closed at the bottom by automatically activated lids.

The boxes of the discharge hopper are in the shape of a parallelepiped and operators place premiums in them by hand. Premiums are taken from 16 storage chutes 2 that are placed behind and above discharge hoppers 1. For each hoper 1 there is a chute 2, thus allowing a different article to be stored in each chute.

The width of discharge hoppers 1 is slightly less than the buckets 5 in order to insure transfer of articles from one to the other.

The lids of the hoppers are operated, in groups of two, by 8 connecting rods 50 with shock absorbers, in turn driven by 8 arms 51 affixed to a shaft 52 having a diameter of 34 mm.

Shaft 52 is driven by another arm 53 similar to the others joined by a rigid connecting rod 54 to the lever 55 of the follower 56 of a cam 20.

Cam 20 is circular, having a negative rise, and is activated by one of the upper sprockets through a gear train 57 of a 2 to 1 ratio. As each revolution of the sprockets causes eight buckets to move thereover, each two revolutions of same causes 16 buckets 5 to pass this being equivalent to a complete revolution of cam 20. When chain 4 stops, the follower 56 rolling on the surface of cam 20 falls within socket 58 forming the negative rise; thus producing the movement which activates the 8 releasing arms 51. A spring 59 sets between the arm of the follower and a fixed part of the machine forces follower 56 to roll on the face of cam 20 during its run.

The above movement, in addition to activating the releasing arms 51, is used to set buckets 5 in position exactly beneath discharge hoppers 1 during the time the upper part of chain 4 is motionless. This is achieved by the resistance of the cam follower 56 to leaving the socket 58. Said resistance counteracts the force of inertia during the cessation of motion and permits the upper part of chain 4 to stop in the same position each time.

The electronic device 37 for the detection of articles consists of a group of photo-electric cells which receive light through holes 42 to 46 especially designed and set in each of buckets 5. A source of light 14 provides illumination as required for said process. When there is no article inside bucket 5, the electronic device 37 sends a signal which is mechanically recorded on a wheel 60 containing 16 memory elements corresponding to each one of hoppers 1. Memory wheel 60 by especially designed parts integrates the two speeds, the intermittent speed of the upper part of chain 4 of the premium feeder, and the constant speed of the packaging machine. At the right time, approximately 12 cycles after a bucket 5 without a premium has been detected, said device sends out an electric signal to the feeding system of the packaging machine preventing the latter from feeding the corresponding container. The container missing in the packaging machine coincides exactly with the empty bucket 5. It is thus insured that all containers passing by the machine carry articles or premiums.

During operation chain 4 with buckets 5 is moving at the same speed as the packaging machine. However, only the lower part of the machine maintains a constant speed as the swing arms 6 and 7 force the upper part of chain 4 to work intermittently in cycles of 16 buckets 5, or—that is to say—in cycles of 16 containers of the packaging machine. Therefore, the swing arms 6 and 7 complete their cycle in a time equal to 16 cycles or operations of the packaging machine.

Four workers on a specially constructed platform at a height of approximately 3 meters over floor level, seated facing discharge hoppers 1, load same during the time the upper part of chain 4 is in movement. When the upper part of chain 4 comes to a stop, discharge hoppers 1 open and the 16 articles simultaneously drop into 16 buckets 5 that are set or placed, while stopped, directly beneath each one of the discharge hoppers 1. After transfer is effected from discharge hoppers 1 to buckets 5, hopper 1 doors should close and chain 4 start moving once more.

In the posterior part of the feeding machine, there is another platform situated approximately at the same height as the platform for operators, in which articles are put away in cardboard boxes. One operator on this platform maintains a constant supply of articles to hoppers 1 or chutes 2 of same. The machine is equipped with 16 chutes 2 for articles which the operator fills as it becomes necessary.

Experience has proved that it is necessary to provide a different bucket design for each size of container used. Except for this condition and with slight modifications, the feeding machine can be employed in combination with any automatic filling and packaging machine having continuous movement at high speed.

Having described the invention, I consider as original and therefore claim as my own, the contents of the following:

1. A machine for feeding premiums into containers moving on a packaging machine comprising a frame, a pair of lower stationary sprockets rotatable on said frame, means for driving one of said lower sprockets, a pair of upper stationary sprockets rotatable on said frame, a pair of arms mounted for oscillating movement on said frame, an oscillating sprocket mounted for free rotation near the end of each of said arms, said upper, lower and oscillating sprockets being in the same plane, an endless chain engaging said sprockets such that the upper and lower sprockets are inside the chain's periphery and the two oscillating sprockets are outside the chain's periphery, a plurality of premium receiving buckets mounted on and moved by said chain, a hopper for placing premiums in a given number of buckets when between said upper sprockets, and means for imparting oscillatory movement to said arms so that the length of chain between the upper sprockets is momentarily stationary to allow the hopper to discharge premiums into each stationary bucket while the length of chain between the lower sprockets maintains its linear speed to feed premiums from the buckets moving therebetween into containers moving on a packaging machine at a constant speed.

2. A machine for depositing premiums into successive containers moving on a packaging machine conveyor comprising a frame, upper and lower pairs of sprockets mounted for rotation on said frame, one of said sprockets being connected to a motive power source so that it is driven in timed relationship to the containers moving on said packaging machine, a pair of oscillating sprockets mounted on separate oscillating arms, said arms being connected by a rigid bar, said oscillating sprockets being mounted between said upper and lower pairs of sprockets, all of said sprockets being in the same plane, an endless chain wrapped around said sprockets so that the upper and lower pairs are within the periphery of said chain, the oscillating sprockets being in engagement with said chain but outside its periphery, a plurality of enclosed buckets attached to said chain, said buckets having cooperating hinged covers at one end, a plurality of hoppers adapted to receive premiums and feed them into the buckets, means for opening the covers of said buckets prior to their passage beneath said hoppers, means for closing said covers after the deposit of a premium into the buckets, and means for oscillating said oscillating sprockets so that the chain segment beneath said hoppers is momentarily stopped thus allowing the hoppers to deposit premiums into those buckets that are momentarily at rest beneath the hoppers while the chain segment moving above the containers and depositing premiums therein maintains a substantially constant speed.

3. A machine for depositing premiums into successive containers moving on a packaging machine conveyor comprising a frame, upper and lower pairs of sprockets mounted for rotation on said frame, motive power means for driving one of said sprockets in timed relationship to the containers moving on said packaging machine conveyor, a pair of arms pivotally mounted on said frame, a sprocket mounted for free rotation near the free end of each of said arms, means for oscillating said arms in synchronism with the containers moving on the packaging machine conveyor, all of said sprockets being in the same plane, an endless chain engaged by all of said sprockets such that the upper and lower pairs of sprockets are inside the chain periphery and the sprockets on said arms engage the chain outside its periphery, a plurality of buckets attached to said chain, cover means for opening and closing said buckets, a hopper adapted to feed premiums into said buckets when between said upper pair of sprockets, said means for oscillating said arms being timed to intermittently stop the chain segment beneath the hopper to allow the hopper to deposit premiums into successive groups of buckets that momentarily come to rest beneath the hopper while the chain segment moving between said lower pair of sprockets is maintained at a substantially constant speed.

4. A machine for depositing premiums into successive containers moving on a packaging machine conveyor comprising a frame, a pair of lower sprockets mounted on said frame just above the packaging machine conveyor, a pair of upper sprockets mounted on said frame substantially above said lower pair of sprockets but in the same plane with said lower pair of sprockets, a pair of intermediate sprockets mounted for oscillatory movement on said frame between said lower and upper pairs of sprockets and in the same plane as said upper and lower pairs of sprockets, an endless chain traveling over all of said sprockets, said lower and upper sprockets being inside the boundary of said chain and said intermediate sprockets being outside the chain boundary but in contact therewith, a plurality of buckets mounted on said chain each of said buckets being capable of holding and carrying a premium, a hopper mounted on said frame above the upper pair of sprockets for inserting premiums into the buckets on said chain, means for oscillating said intermediate sprockets in timed relationship with said packaging machine conveyor so that successive groups of buckets between said upper pair of sprockets are momentarily brought to rest to allow premiums to be deposited into the buckets from the hopper, said oscillating means having no substantial effect on the movement of the buckets between the lower pair of sprockets where the premiums are deposited into the containers.

No references cited.